US005915602A

United States Patent [19]

Nelson

[11] Patent Number: 5,915,602

[45] Date of Patent: Jun. 29, 1999

[54] PORTABLE BAR WITH MOVABLE TOP

[76] Inventor: Andrew Douglas Nelson, 15150 E. 100 St. North, Owasso, Okla. 74055

[21] Appl. No.: 08/829,159

[22] Filed: Mar. 31, 1997

[51] Int. Cl.$^{6}$ .................... A01C 35/00

[52] U.S. Cl. .................... 222/608; 108/143

[58] Field of Search .................... 222/608, 129.1–129.4, 222/77, 113, 146.6; 312/249.8, 249.13; 108/137, 143

[56] References Cited

U.S. PATENT DOCUMENTS

| | | | |
|---|---|---|---|
| D. 326,024 | 5/1992 | Boyd et al. | D6/480 |
| 3,627,399 | 12/1971 | Addison | 312/351 |
| 3,712,514 | 1/1973 | LeBlanc | 222/146 C |
| 3,790,032 | 2/1974 | George | 222/146 |
| 3,865,276 | 2/1975 | Thompson | 222/146 C |
| 3,933,275 | 1/1976 | Metzner et al. | 222/131 |
| 3,949,902 | 4/1976 | Thompson | 222/129.1 |
| 4,130,070 | 12/1978 | Herrin | 108/143 |
| 4,225,059 | 9/1980 | Kappos | 222/146 C |
| 4,518,104 | 5/1985 | Iannelli et al. | 222/146.6 |
| 5,192,003 | 3/1993 | Billings | 222/129.1 |
| 5,251,790 | 10/1993 | Cohn et al. | 222/146.6 |
| 5,564,602 | 10/1996 | Cleland et al. | 222/146.6 |
| 5,697,686 | 12/1997 | Miller et al. | 108/143 X |

*Primary Examiner*—Gregory L. Huson
*Attorney, Agent, or Firm*—Molly D. McKay

[57] ABSTRACT

A portable bar capable of having its customer counter either slid backward and the overhanging portion pivoted downward or, alternately, completely removed from a base cabinet in order to allow the portable bar to reduce in width in order to allow it to be rolled through a standard size door frame. The base of the portable bar has a lighted work surface, top opening ice storage bin, and a slanted tower for dispensing cold beer or other beverages on tap. The base of the portable bar also has concealed storage for a $CO_2$ gas bottle, one or more kegs of beer or other beverages, a weight measuring system for indicating the amount of beer or other beverages remaining within each keg, electrical and water supply connections, a refrigeration unit and a liquid waste storage system.

17 Claims, 5 Drawing Sheets

PORTABLE BAR WITH MOVABLE TOP

BACKGROUND OF THE INVENTION

1. Field of the Invention

The present invention relates to a self-contained portable cabinet or mobile bar for use in bartending. The mobile bar is designed with an upper bar rail or customer counter which can be either displaced or completely removed from the base of the bar to allow the bar to pass through a standard size doorway.

2. Description of the Related Art

Currently, when there is a need to set up a bar at a remote location which is not equipped with a built-in bar cabinet, such as inside an individual's home or in an office location, the bartender normally must make do with what is available at the site or work behind some type of portable table, such as a portable folding table. In these make-shift types of arrangements, it is often difficult to organize all the necessary equipment into a functional arrangement and almost impossible to achieve an efficient and attractive arrangement.

An ideal arrangement would be to have a portable bar which would be narrow enough to be rolled on casters through a standard size doorway. One problem faced in creating such a portable bar arrangement is that the smallest commercially available refrigerator is too large to incorporate into a cabinet and still allow the cabinet to pass through a standard 29 inch doorway. The ideal arrangement would also have to provide adequate lower counter space or bartender counter space for storing liquor bottles and for mixing and serving drinks, adequate elevated customer counter space for allowing patrons to stand around the bar and place their drinks on the elevated customer counter surface, and provide efficient and attractive storage for either standard 15.5 gallon beer kegs, 7.75 gallon pony kegs or 5 gallon soda kegs, gas bottles, ice, and a refrigeration system for keeping the kegs of beer or soda pop chilled.

The present invention addresses this need by providing a portable bar which includes a built in refrigeration system and can be easily transported by one or two people into and out of buildings through standard size doorways. In addition, once the present invention is positioned in the desired location and prepared for use, it has plenty of counter space and provides attractive storage for all items and equipment needed to serve both cold beer on tap and mixed drinks. The present invention also incorporates a weighing system for measuring the weight of each keg while the kegs are in use as a means to indicate the number of servings of beer remaining in each keg. This allows the bartender to make arrangements to obtain a new full keg before the keg or kegs which are in service run dry. Also, the present invention operates on electricity supplied to it by an electrical extension cord and receives its water supply via a standard garden hose, thus allowing the invention to be used outdoors as well as inside a building. Finally, the present invention has a removable customer counter which can be replaced with a variety of other alternate counter configurations, such as counters for card tables, conference tables, etc.

SUMMARY OF THE INVENTION

The present invention is a mobile bar comprised of a base cabinet and a removable customer counter removably secured to the base cabinet. The base cabinet is mounted on lockable casters and has enclosed under-counter space. The enclosed under-counter space is divided by two thermally insulated partition walls into a gas compartment, a refrigerated keg compartment, and a refrigeration unit compartment.

The base cabinet is provided with a gas compartment door on its rear side in order to provide access to the gas compartment. A standard 20 pound $CO_2$ gas bottle can be removably stored in the gas compartment and is held in an upright position therein by straps or chains which are secured around the gas bottle by means of releasable securing means provided in the gas compartment. A retaining ring extends over a valve stem of the gas bottle and is secured in place by straps or chains to insure that the gas bottle will not be damaged if the mobile bar is tipped over.

A floor of the base cabinet is provided with an electrical access opening which extends through the floor into the gas compartment. An electrical supply cord attaches on one end to a remote power source and may be inserted though the electrical access opening. A second end of the electrical supply cord provides electricity to electrical outlets located in the gas compartment. A battery is also provided in the gas compartment as a backup supply of electricity for the mobile bar.

A first power cord attaches to the electrical outlets and supplies electricity to a light bulb also provided within the gas compartment in order to provide light for viewing pressure indications on a pressure regulator secured to a gas valve at the valve stem of the gas bottle. A gas line runs from the pressure regulator, through a first opening in the thermally insulated partition wall, and secures to a first keg of beverage provided in the keg compartment.

The base cabinet is provided with first and second keg compartment doors which provide access to the keg compartment. The first keg sits on a first scale and an optional second keg sits on second scale. Both first and second scales are provided within the keg compartment. A first drain hole and a second drain hole are provided in the rear of the base cabinet. The first and second drain holes connect respectively to the first and second scales in order to drain spilled liquids off the scales and out of the base cabinet.

The first scale electrically attaches to a first proximity switch via a first electrical connection. Likewise, the second scale electrically attaches to a second proximity switch via a third electrical connection.

A second power cord supplies electricity from the electrical outlets to the first proximity switch and a third power cord supplies electricity from the electrical outlets to the second proximity switch.

The first proximity switch electrically attaches to a first indicator device via a second electrical connection, and the second proximity switch electrically attaches to a second indicator device via a fourth electrical connection.

Cooling plates are located in the keg compartment adjacent the kegs, and the cooling plates receive coolant via coolant lines from condenser tubes located in the refrigeration unit compartment.

Beverage supply lines run from each keg to a spigot provided on a tower extending upward from a bartender counter on the base cabinet. A sink is provided in the bartender cabinet under the spigots.

An ice storage bin extends downward from the bartender counter into the keg compartment, and ice stored within the ice storage bin can be accessed via an ice bin access door provided on the bartender counter. An opening is provided in a bottom of the ice storage bin. One end of an ice water supply line attaches to the opening so that, as the ice melts within the ice storage bin, the cold ice water drains through the opening into the ice water supply line. A second end of the ice water supply line attaches to an ice water valve provided on the rear of the base cabinet.

A water spray nozzle is provided in the bartender counter adjacent to the sink. A water supply line attaches on one end to the water spray nozzle, extends through a nozzle opening in the bartender counter and attaches on its opposite end to a water faucet provided within the refrigeration unit compartment. A garden hose secures on its first end to a remote water supply, enters the refrigeration unit compartment via a water access opening provided in the floor of the base cabinet, and removably secures to the water faucet in order to provide water to the water spray nozzle.

A drain line extends from the sink to a drain bucket provided in the refrigeration unit compartment. A right side wall of the base cabinet is provided with a refrigeration unit compartment door for obtaining access to the refrigeration unit compartment in order to dump the waste liquid which accumulates in the drain bucket. Alternately the drain bucket is provided with a drain bucket opening which is normally plugged, but which can be unplugged to drain waste liquid from the drain bucket without the necessity of removing the drain bucket from the refrigeration unit compartment.

The gas compartment door, the first and second keg compartment doors, the refrigeration unit compartment door and the ice bin access door each is provided with hinges for opening the door, provided with latches for securing the door closed and optionally provided with a handle to facilitate opening and closing the door.

A compressor located within the refrigeration unit compartment is provided with electricity via a fourth power cord which runs from the electrical outlets. The compressor receives coolant from the cooling plates and supplies compressed coolant to the condenser tubes.

The base cabinet is provided with upwardly extending left, right and front support walls on, respectively left, right and fronts sides of the base cabinet. Glass blocks may optionally be incorporated into the left, right and front support walls.

The bartender counter is provided with an electrical cord opening through which a fifth power cord extends. The fifth power cord attaches on one end to the electrical outlets and on an opposite end to a fluorescent light removably secured to a bottom side of the customer cabinet.

A rail is provided on the perimeter of the customer counter except at the rear side. The rail is provided with two corners which secure to the customer counter via corner hinges which allow the corners to pivot upward 90°.

Right, left and center tracks removably secure the customer counter to the left, right and front support walls. Each track is provided with an upper track part which secures to the bottom side of the customer counter. The right, left and center tracks each have mating lower track parts provided respectively on the right left and front support walls.

The upper track part of each track is provided with inwardly concave lips on both of its downwardly extending left and right side edges. The lower track part of each track is provided with a set of ball bearings movably secured within a pair of upwardly extending and outwardly concave lips. Movable engagement of the mating upper and lower track parts of the right, left and center tracks allows these tracks to move back and forth along the longitudinal axes, respectively of the right, left and center tracks.

Spring biased latching bolts are movably provided on first and second upper brackets located respectively adjacent to a left side edge of the right track and adjacent to a right side edge of the left track.

Bolt holes are provided in first and second lower brackets to removably receive the spring biased latching bolts. The lower brackets secure respectively to the left and right support walls. Each spring biased latching bolt is provided with an inwardly biasing spring which causes a latching end of each bolt to move into its associated bolt hole. In order to unlock the customer counter from the base cabinet, a head of each latching bolt is pulled outward and a pin is inserted into a pin hole provided in each bolt adjacent the latching end in order to lock the bolt in an unlatched position. Alternately, instead of using a pin, another type of latching bolt may be employed which locks open when rotated.

The customer counter is provided with two rear portions which pivotally secure to the customer counter via hinges provided on the bottom side of the customer counter. When the customer counter moves rearward relative to the base cabinet, the rear portions pivot downward at a 90° angle so that they hang parallel to the rear of the base cabinet.

The original customer counter can be detached from the base cabinet by sliding it toward the front side 146 of the cabinet. Once the original customer counter is removed, a first, second or third alternate customer counter can be secured to the base cabinet. Each of the alternate customer counters may optionally be provided with a detachable alternate fluorescent light which receives electricity via an alternate fifth power cord which runs from the electrical outlets.

Each alternate customer counter is provided with posts which secure to a bottom of the counter and extend downward therefrom. A distal end of each post is provided with a horizontal post opening. The base cabinet is provided with vertical mating post holes into which the distal ends of the posts insert. A locking pin inserts into a horizontal pin opening in the base cabinet and into the post opening for each post to removably secure the alternate customer counter to the base cabinet.

The various alternate customer counters may be of various shapes and may be provided with large central openings, off-center smaller openings, large circular openings or other similar shapes or openings therein. Also each alternate customer counter may be provided with an alternate rail around its perimeter.

DETAILED DESCRIPTION OF THE PREFERRED EMBODIMENT

Figure 1:
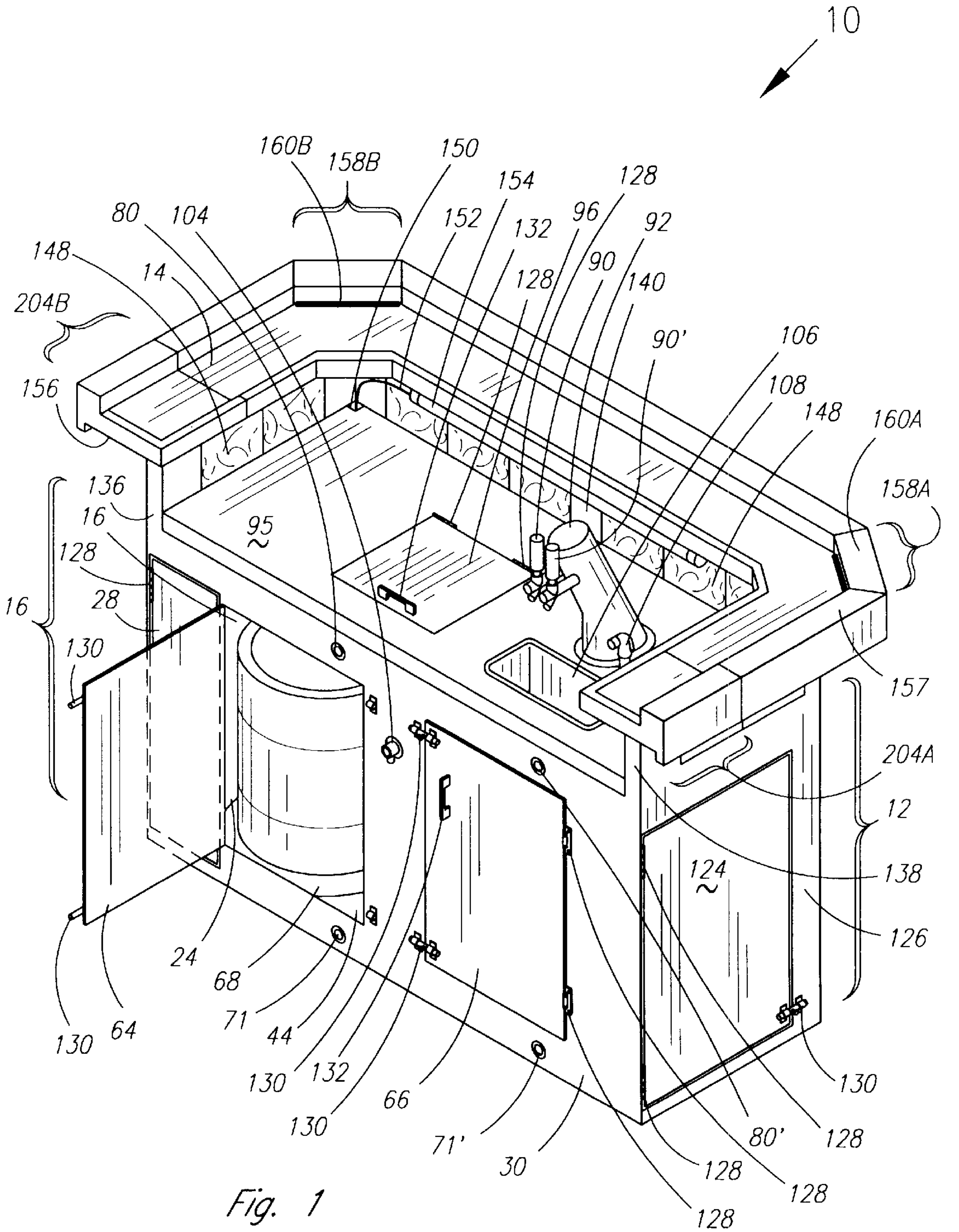
FIG. 1 is a perspective view of a mobile bar constructed in accordance with a preferred embodiment of the present invention.

Referring now to the drawings and initially to FIG. 1, there is shown a mobile bar 10 constructed in accordance with a preferred embodiment of the present invention. The bar 10 is comprised of a base cabinet 12 onto which a removable customer counter 14 is movably attached, as will be described more fully hereafter.

Figure 2:
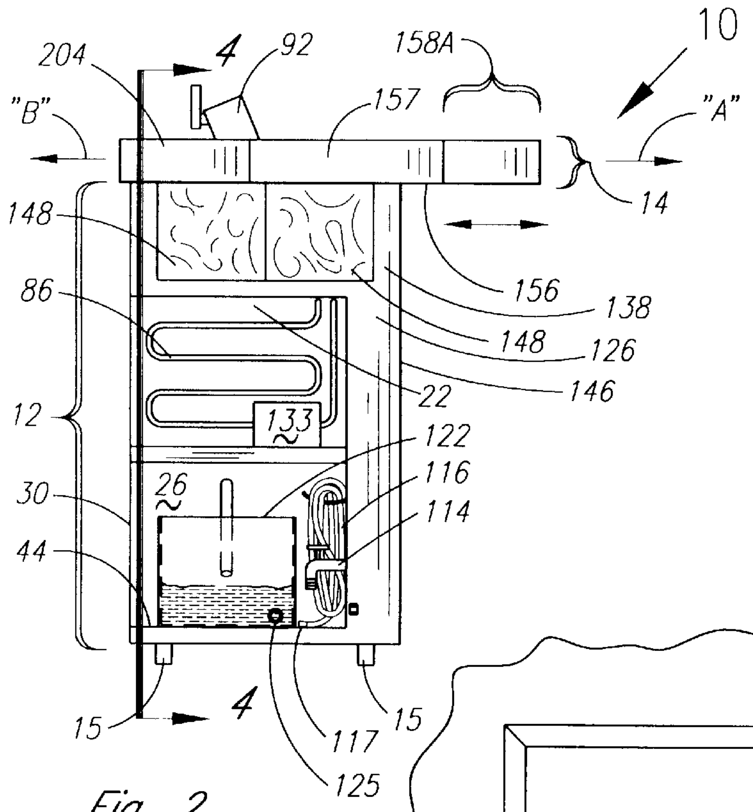
FIG. 2 is a right side elevation of the mobile bar of FIG. 1, shown with the right side door removed.
Figure 3:
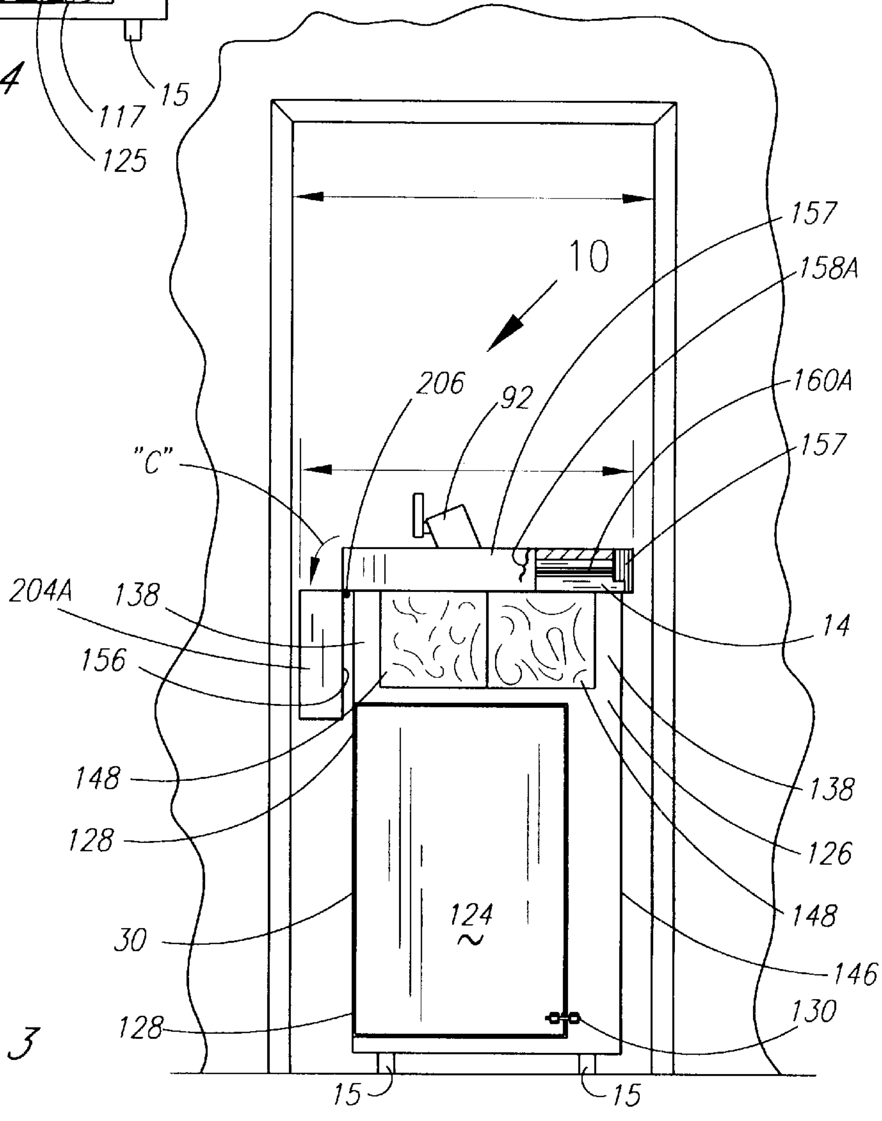
FIG. 3 is a right side elevation of the mobile bar of FIG. 1 shown with the corners of the customer counter in a raised position and with the customer counter slid toward the back of the portable bar, thus allowing the mobile bar to pass through a door frame.
Figure 4:
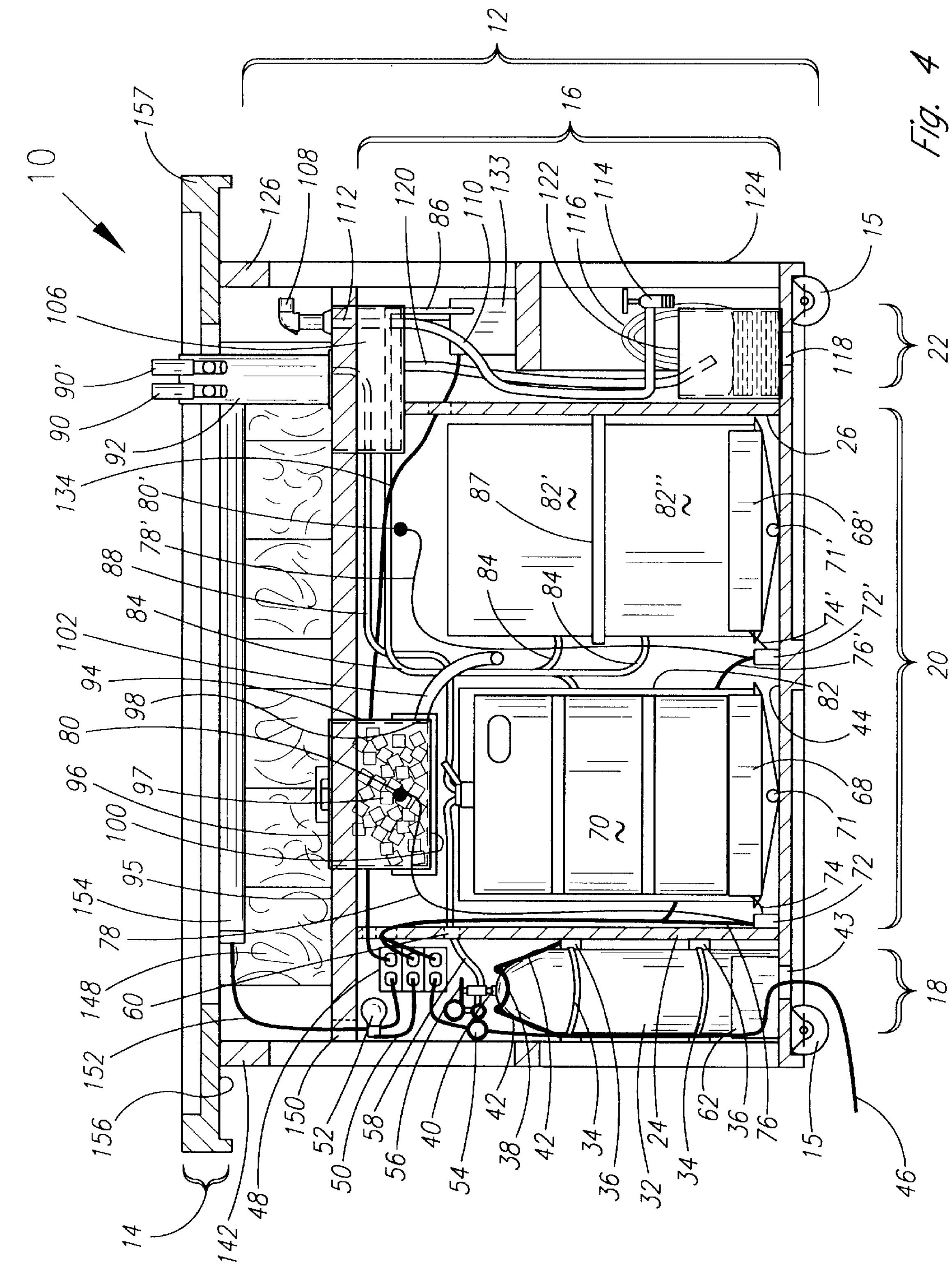
FIG. 4 is a cross sectional view taken along line 4—4 of FIG. 2.

As shown in FIGS. 2–4, the base cabinet 12 is mounted on four pivotable, lockable casters 15 which allow the bar 10 to be moved about thereon and when in use, locked in place to prevent the bar 10 from rolling away. An enclosed under counter space 16 is preferable provided with three compartments, i.e. a gas compartment 18, a keg compartment 20 and a refrigeration unit compartment 22, which are separated from each other by two (2) thermally insulated partition walls 24 and 26.

Referring now to both FIGS. 1 and 4, the gas compartment 18 is accessed by means of a gas compartment door 28 provided at a rear side 30 of the base cabinet 12 of the bar 10. A standard twenty (20) pound carbon dioxide ($CO_2$) gas bottle or cylinder 32 is removably secured in an upright position within the gas compartment 18 by means of one or more straps or chains 34 which extend around the $CO_2$ gas bottle 34 and secure the gas bottle 34 within the gas compartment 18 by releasable securing means 36.

In addition, a retaining ring 38 is placed over a valve stem 40 of the gas bottle 32 and straps or chains 42 releasably secure the retaining ring 38 to the releasable securing means 36. The retaining ring 38 prevents the gas bottle 32 from accidentally tipping out of the gas compartment 18 and damaging or knocking the valve stem 40 off the gas bottle 32.

The gas compartment 18 is provided with an electrical access opening 43 in a floor 44 of the base cabinet 12 through which an electrical supply cord 46 enters the gas compartment 18. The electrical supply cord 46 may simply be an electrical extension cord running from an AC power supply (not illustrated) and running to and providing electrical power to a set of electrical outlets 48 provided within the gas compartment 18. A first power cord 50 runs from the electrical outlets 48 to supply electricity to a light bulb 52 located within the gas compartment 18. The light bulb 52 provides a bartender with sufficient light to read a pressure indication on a pressure regulator 54 provided attached to a gas valve 56 secured at the valve stem 40. A gas line 58 attaches to the gas regulator 54 and passes through a first opening 60 provided in the first partition wall 24 to enter the keg compartment 20.

A battery 62 is also provided in the gas compartment 18 as a backup or alternate power supply for the bar 10. In order to utilize the battery 62 as a power supply, appropriate electrical connection between the battery 62 and the electrical outlets must be established. Then, the electrical equipment contained within the bar 10 must be set to a DC power supply setting so that it will operate on DC power, rather than the normal AC power supply.

The keg compartment 20 is accessed by means of two (2) keg compartment doors, a first keg compartment door 64 and a second keg compartment door 66. The first keg compartment door 64 opens to provide access to a first scale 68. A first keg 70 of beer or soda pop is placed on the first scale 68, and the first scale 68 continuously measures the weight of the first keg 70. The first scale 68 also serves as a drip pan, and any liquid which is spilled or which leaks onto the first scale 68 runs from the first scale 68 to a first drain hole 71 provided at the rear side 30. A first proximity switch 72 located within the keg compartment 20 adjacent to the first scale 68 is electrically connected to the first scale 68 via a first electrical connection 74 and receives electrical power via a second power cord 76 which connects to the electrical outlets 48. The first proximity switch 72 is electrically connected via a second electrical connection 78 to a first indicator device 80, such as an indicator light, provided on the rear side 30. The first keg 70 is preferably a standard 15.5 gallon keg which, when full, normally contains approximately 165 of 12 fluid ounce servings of beer. When the first keg 70 is used until only approximately 20 of 12 fluid ounce servings of beer remain in the first keg 70, the first proximity switch 72 is activated, thus causing the first indicator device 80 to be activated to indicate to the bartender that the first keg 70 is almost empty and will need to be replaced soon. The first proximity switch 72 will need adjustment depending on the type and weight of the kegs employed.

Optionally, although not illustrated, the proximity switch 72 and the first indicator device 80 may be replaced with a strain gauge and a meter to provide continuous indication and more accurate reading regarding the amount of beverage remaining in a keg 70.

The keg compartment 20 is thermally insulated in order that its contents may be kept cold. At least one cooling plate 82 is provided adjacent to the first keg 70 to provide refrigeration to the first keg 70 in order to keep the beer contained therein cold.

Likewise, the second keg compartment door 66 opens to provide access to a second scale 68'. A second keg (not illustrated) of beer may be placed on the second scale 68' so that the second scale 68' continuously measures the weight of the second keg (not illustrated). The second scale 68' also serves as a drip pan, and any liquid which is spilled or which leaks onto the second scale 68' runs from the second scale 68' to a second drain hole 71' provided at the rear side 30. A second proximity switch 72' located within the keg compartment 20 adjacent to the second scale 68' is electrically connected to the second scale 68' via a third electrical connection 74' and receives electrical power via a third power cord 76' which connects to the electrical outlets 48. The second proximity switch 72' is electrically connected via a fourth electrical connection 78' to a second indicator device 80', such as an indicator light, meter or dial.

Two cooling plates 82' and 82" are illustrated in FIG. 4 in association with the second scale 68'. Each of the cooling plates 82, 82' and 82" receives, via coolant lines 84, low temperature and low pressure coolant from condenser tubes 86 located in the refrigeration unit compartment 22. Also, as shown in FIG. 4, an optional shelf 87 may be removably secured to the thermally insulated wall 26 when a second keg is not in use in order to provide added shelf space within the refrigerated keg compartment 20.

Figure 7:
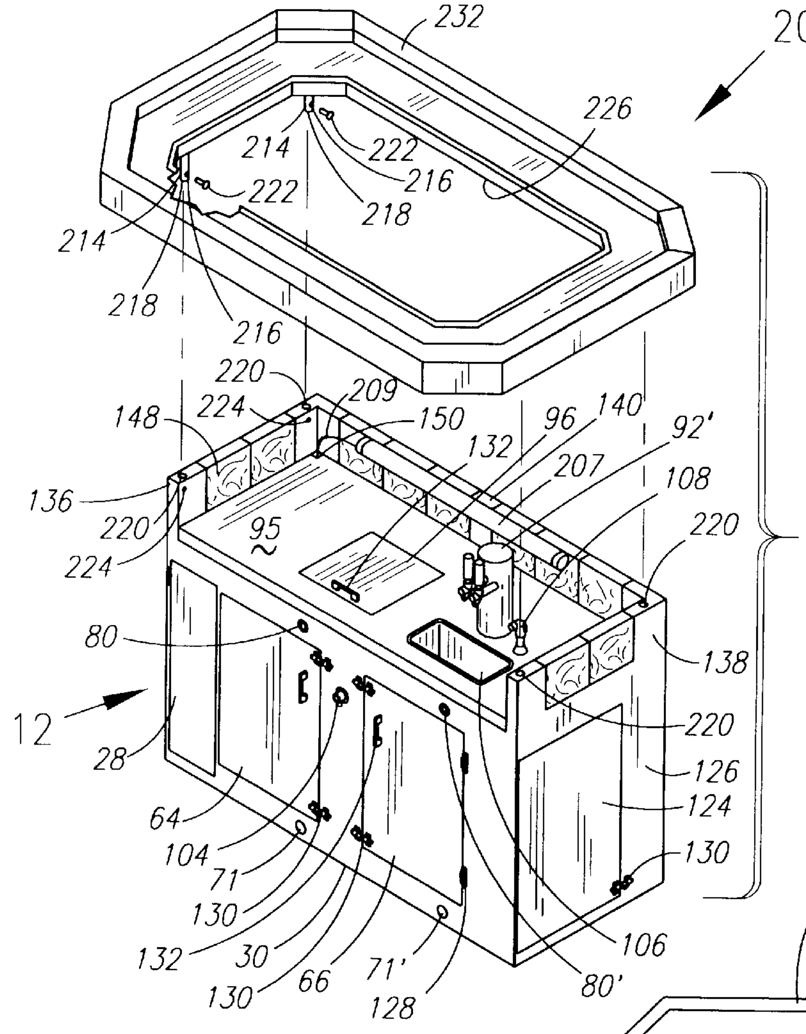
FIG. 7 is an exploded perspective view of a first alternate embodiment customer counter and the base cabinet, showing details of attachment.

The gas line 58 attaches to the keg 70 or kegs and serves to pressurize the keg 70 or kegs. Each keg 70 has a beer or beverage supply line 88 running from the keg 70 to a spigot, either 90 or 90' provided on a slanted beer dispensing tower 92 or draft arm which extends upward above a bartender counter 95 provided on the base cabinet 12. Alternately, as shown in FIG. 7, a non-slanted beer dispensing tower 92' may be used instead of a slanted beer dispensing tower 92. The purpose for using the slanted beer dispensing tower 92 instead of the non-slanted tower 92' is that the slanted tower 92, although slightly more expensive than the non-slanted tower 92', allows the customer counter 14 to move toward the rear side 30 of the base cabinet 12, as will be described more fully hereafter.

An ice storage bin 94 extends downward into the refrigerated keg compartment 20 from the bartender counter 95. A upwardly opening ice bin access door 96 is provided on the bartender counter 95 to provide access to ice 97 stored within the ice storage bin 94. The ice storage bin 94 is provided with an opening 98 located adjacent a bottom 100 of the ice storage bin 94 through which ice water, created as a result of melting of the ice 97, exits the ice storage bin 94 and enters an ice water supply line 102 which terminates at an ice water valve 104 provided on the rear side 30 of the base cabinet 12 of the bar 10. In order to obtain ice water for creating a mixed drink, the bartender simply opens the ice water valve 104, and ice water which is stored within the ice water supply line 102 flows out of the ice water valve 104. The ice water valve 104 is then again closed in order to stop the flow of ice water.

A sink 106 is provided in the bartender counter 95 immediately below the tower 92 in order to receive any beer which is spilled when filling a beer glass from the tower 92. A water spray nozzle 108 is also provided adjacent to the sink 106. The water spray nozzle 108 receives a supply of water via a water supply line 110. The water supply line extends from the nozzle 108, through a nozzle opening 112 provided in the bartender counter 95 and leads to the refrigeration unit compartment 22. The water supply line 110 terminates at a water faucet 114 provided within the refrigeration unit compartment 22.

In order to connect the bar 10 to a supply of fresh drinking water, a standard garden hose 116 is connected on one of its ends to a fresh water supply (not illustrated), and a second end 117 of the hose 116 is fed through a water access opening 118 provided in the floor 44 of the base cabinet 12 of the bar 10 so that the second end 117 of the hose 116 enters the refrigeration unit compartment 22. The second end 117 of the hose 116 is then connected to the water faucet 114, the water supply opened and the water faucet 114 opened so water flows to the water spray nozzle 108. FIGS. 2 and 4 both illustrate the garden hose 116 storaged in the refrigeration unit compartment 22 as it would be stored when transporting the bar 10.

A drain line 120 extends from the sink 106 into a removable drain bucket 122 provided in the refrigeration unit compartment 22. The drain bucket 122 can be removed from the refrigeration unit compartment 22 in order to dispose of liquid wastes which have drained into the bucket 122 via the drain line 120. Alternately, as illustrated in FIG. 2, the drain bucket 122 is provided with a drain bucket opening 125 near the bottom of the drain bucket 122 which can be opened to drain waste fluid from the drain bucket 122 without removing the drain bucket 122 from the refrigeration unit compartment 22.

A refrigeration unit compartment door 124 is provided in a right side wall 126 of the base cabinet 12 and may be swing open on hinges 128 by which it attaches to the base cabinet 12 in order to provide access by the bartender to the refrigeration unit compartment 22. The refrigeration unit compartment door 124 is provided with a latch 130 for securing the door 124 in a closed position, as illustrated in FIG. 1. Likewise, the keg compartment doors 64 and 66, the gas compartment door 28 and the ice bin access door 96 are each provided with two (2) hinges 128 and a latch 130 for allowing them to swing open and to be secured in a closed position. Handles 132 are also optionally provided on each door 124, 64, 66, 28 and 96.

The refrigeration unit compartment 22 also contains a compressor 133 which receives electrical power via a fourth power cord 134 from the electrical outlets 48. The compressor 133 receives high temperature and low pressure refrigerant from the cooling plates 82, 82' and 82", and supplies high temperature and high pressure refrigerant to the condenser tubes 86 in order to complete the refrigeration cycle.

Upwardly extending left, right and front support walls 136, 138 and 140 extend upward approximately ten (10) inches beyond the bartender counter 95 on a left side 142, on the right side 126 and on a front side 144 of the base cabinet 12 of the bar 10.

Glass blocks 148 are optionally inserted in the support walls 136, 138 and 140 to allow patrons to see through them to view the lighted bartender counter 95 and to view bottles of liquor which may be stored on the bartender counter 95 adjacent to the glass blocks 148.

The bartender counter 95 is provided with an electrical cord opening 150 through which a fifth power cord 152 extends. The fifth power cord 152 plugs into the electrical outlets 48 on one of its ends, and on its other end attaches to a fluorescent light 154 which is secured to a bottom side 156 of the customer counter 14.

Referring now to FIGS. 1, 2 and 3, the customer counter 14 is provided with a rail 157 around the perimeter of the customer counter 14. The rail 157 is provided with two 450 corners 158A and 158B which are secured to the customer counter 14 by corner hinges 160A and 160B which allow the corners 158A and 158B to pivot on the corner hinges 160A and 160B upward so that the corners 158A and 158B are pivoted 90° from their original position. The original position of the corners 158A and 158B is illustrated in FIG. 1, the original position of corner 158A is illustrated in FIG. 2 and the 90° pivoted position for corner 158A is illustrated in FIG. 3.

Figure 5:
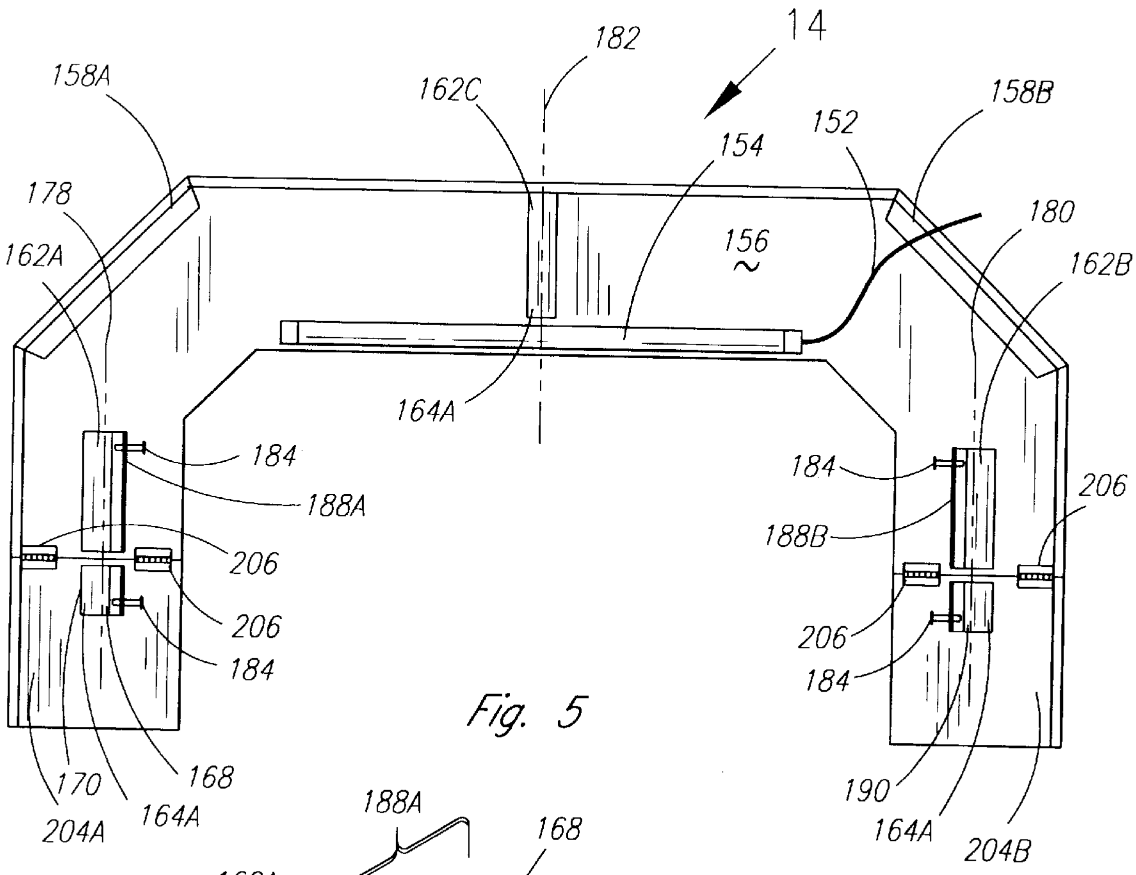
FIG. 5 is bottom plan view of the customer counter which is shown removed from a base of the invention in order to show details of its attachment to the base cabinet.
Figure 6:
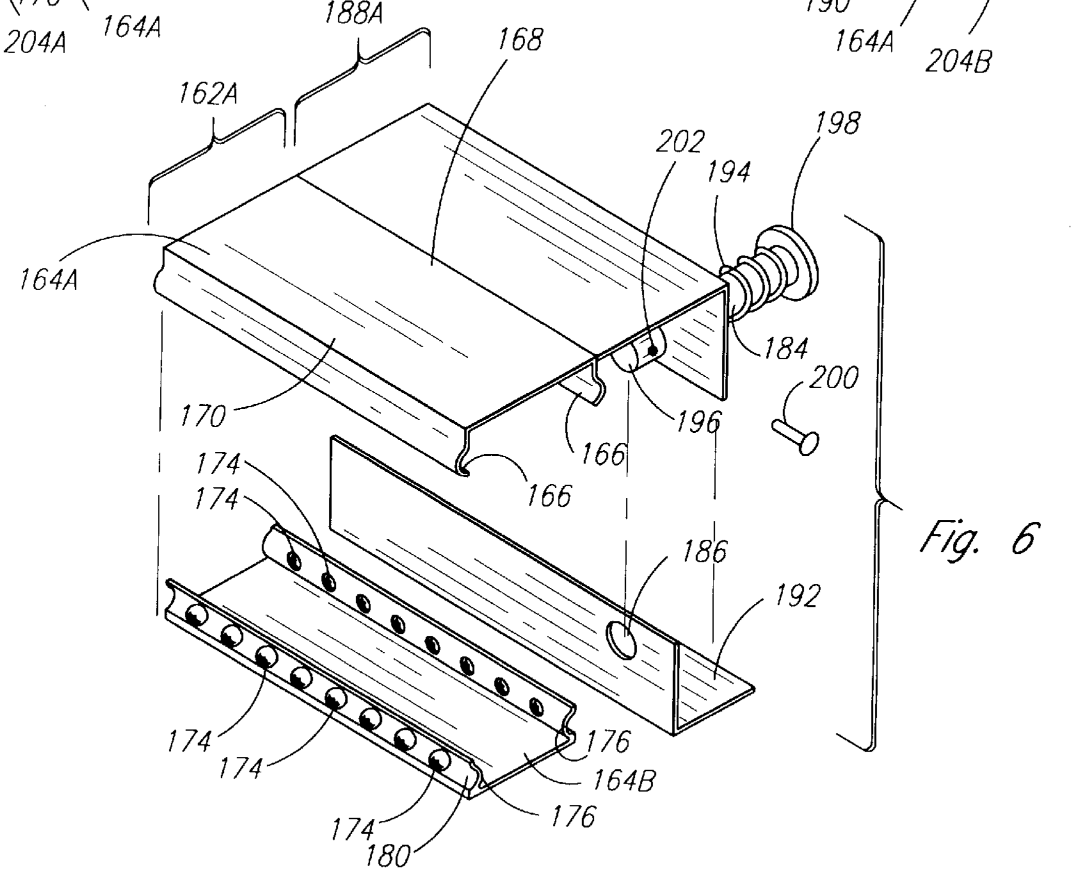
FIG. 6 is an exploded, enlarged, perspective view of one of the tracks and a latch mechanism shown in FIG. 5.

It is important that the corners 158A and 158B be 90° pivotable so that the customer counter 14 can be moved or slid on tracks 162A, 162B, 162C, as illustrated in FIGS. 5 and 6, so that the customer counter 14 can be placed into the transport position, as illustrated in FIG. 3. By pivoting at 90°, the corners 158A and 158B do not bump against the support walls 136, 138 and 140 of the base cabinet 12 whenever the customer counter 14 is slid toward the rear side 30 in order to move it to the transport position.

Referring now to FIGS. 5 and 6, attachment of the customer counter 14 to the base cabinet 12 is illustrated. Each of the tracks 162A, 162B and 162C is comprised of two separate parts. Each track 162A, 162B and 162C has an upper track part 164A which secures to the bottom side 156 of the customer counter 14, and track 162B has a lower track part 164B which secures to a top surface of the left support wall 136, track 162A has a lower track part 164B which secures to a top surface of the right support wall 138, and track 162C has a lower track part 164B which secures to a top surface of the front support wall 140.

FIG. 6 illustrates for right track 162A the association of the upper track part 164A and the lower track part 164B. The upper track part 164A is provided with a pair of downwardly extending inwardly concave lips 166 at its left and right side edges 168 and 170. Each of these concave lips 166 receives a set of ball bearings 174 which are provided in an upwardly extending, outwardly concave lip 176. The lower track part 164B is provided with a pair of the upwardly extending, outwardly concave lips 176 at its left and right side edges 178 and 180. The two sets of ball bearings 174 of track 162B lie between and are movably retained within the two concave lips 166 of track 162A so that the upper track part 164A, and the customer counter 14, to which it secures, are capable of moving horizontally along longitudinal axis 178, as illustrated in FIG. 5.

Likewise, the upper track parts 164A of the left and center tracks 162B and 162C are capable of moving horizontally along longitudinal axes 180 and 182 respectively. Thus, the customer counter 14 can move in the direction of the front side 146 of the base cabinet 12, as shown by Arrow "A" in FIG. 2, or in the direction of the rear side 30 of the base cabinet 12, as also shown in FIG. 2.

The customer counter 14 may be locked in a serving position, shown in FIG. 1 by allowing spring biased latching bolts 184 to engage bolt holes 186, as shown in FIG. 6. As shown in FIG. 5, latching bolts are provided on two upper brackets 188A and 188B. The first upper bracket 188A, also shown in detail in FIG. 6, is located adjacent to the left side edge 168 of the upper track part 164A for the right track 162A and the second upper bracket 188B is located adjacent to a right side edge 190 of the upper track part 164A for the left track 162B. The first and second upper brackets 188A and 188B also are secured to the bottom side 156 of the customer counter 14.

A first lower bracket 192 is provided secured to the base cabinet 12 adjacent to the left side edge 168 of the upper track part 164A for the right track 162A. A second lower bracket (not illustrated) is also provided secured to the base cabinet 12 adjacent to the right side edge 190 of the upper track part 164A for the left track 162B. As shown in FIG. 6 for the right track 162A, the first upper bracket 188A, and the first lower bracket 192, the spring biased latching bolt 184 is biased by a spring 194 so that the latching bolt 184 normally is biased toward the right track 162A so that a latching end 196 of the latching bolt 184 normally extends through the bolt hole 186 to secure the customer counter 14 in the serving position, shown in FIG. 1, thus preventing the customer counter 14 from moving either in the direction of Arrow "A" or in the direction of Arrow "B". In order to release the spring biased latching bolts 184 from their receiving bolt holes 186, each of the latching bolts 184 must be pulled by their heads 198 out of the bolt holes 186. The latching bolts 184 are then each locked in this extended position by inserting a pin 200 into a pin hole 202 provided adjacent the latching end 196 of each of the latching bolts 184.

After all the latching bolts 184 have been thus secured in their extended positions, the customer counter 14 can be slid either in the direction of Arrow "A" or in the direction of Arrow "B"

As shown in FIGS. 1, 3, and 5, rear portions 204A and 204B are pivotally secured via hinges 206 to the customer counter 14 to form rearward extensions on the customer counter 14.

After the corners 158A and 158B have been pivoted upward at 90°, as previously described, the customer counter 14 can be slid in the direction of Arrow "B". Once the rear portions 204A and 204B clear the base cabinet 12, they both pivot downward, as shown in FIG. 3 by Arrow "C", until they are parallel with the rear side 30 of the base cabinet 12. This places the bar 10 in its transport position.

In order to move the bar 10 back to its serving position from its transport position, the rear portions 204A and 204B are raised, then the customer counter 14 is moved in the direction of Arrow "A" until the latching bolts 184, when released from their locked extended positions by removal of the pins 200 from the pin holes 202, insert into their associated bolt holes 186. This places the bar 10 back into its serving position.

In order to remove the customer counter 14 from the bar 10, the latching bolts 184 are first again locked in their extended position, then the customer counter 14 is moved in the direction of Arrow "B" until the upper track parts 164A move beyond and disengage from the lower track parts 164B, thus disconnecting the customer counter 14 from the base cabinet 12. The customer counter 14 can then be lifted off of the base cabinet 12 or, alternately, replaced on the base cabinet 12 by reversing the above sequence of steps.

Once the customer counter 14 has been removed from the base cabinet 12, any one of several alternate embodiment customer counters, for example 208, 210, or 212, can be secured to the base cabinet 12 as replacements for the original customer counter 14.

The first alternate customer counter 208 is illustrated in FIG. 7 in association with the original base cabinet 12. The first alternate customer counter 208 secures to the base cabinet 12 by means of four posts 214 which extend downward from the first alternate customer counter 208. Each post 214 is provided with a post opening 216 near its distal end 218. The base cabinet 12 is provided with post holes 220 which receive the distal ends 218 of the posts 214. The posts 214 are removably secured in the post holes 220 by means of locking pins 222 which insert through pin openings 224 provided in the base cabinet 12 so that when the locking pins 222 are inserted into their pin openings 224, each of the locking pins 222 also inserts into the post opening 216 in their associated post 214.

The first alternate customer counter 208, illustrated in FIG. 7, is hexagonal in outline and has centrally located a large opening 226 through which the bartender counter 95, the ice bin access door 96, the tower 92, the water spray nozzle 108 and the sink 106 on the base cabinet 12 can be reached. Although not illustrated, the first alternate customer counter 208 may also optionally be provided with an alternate fluorescent light 207, similar to the fluorescent light 154 previously described in association with the original customer counter 14. The alternate fluorescent light 207, shown in FIG. 7, is shown detached from the first alternate customer counter 208, and it is electrically connected to the electrical outlets 48 via an alternate fifth power cord 209 which extends through the electrical cord opening 150 in the bartender counter 95.

Figure 8:
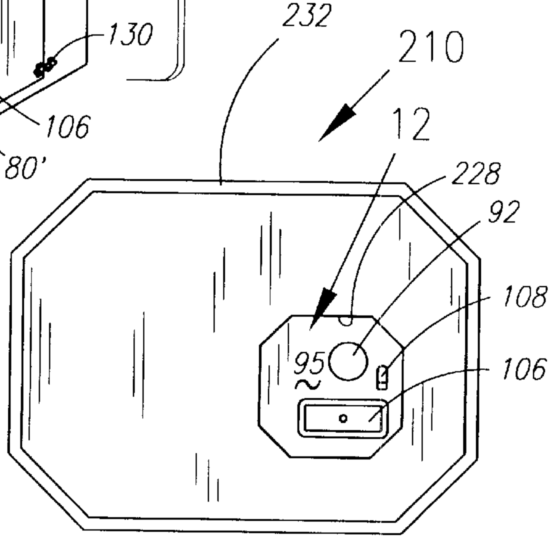
FIG. 8 is a top plan view of a second alternate embodiment customer counter shown attached to the base cabinet.

The second alternate customer counter 210, a card table, which is illustrated in FIG. 8, secures to the base cabinet 12 in the same manner as previously described for the first alternate customer counter 208. The second alternate customer counter 210 is preferably also hexagonal in shape and has an off-center smaller opening 228 therein which allows access only to the tower 92, to the water spray nozzle 108 and to the sink 106 on the base cabinet 12.

Figure 9:
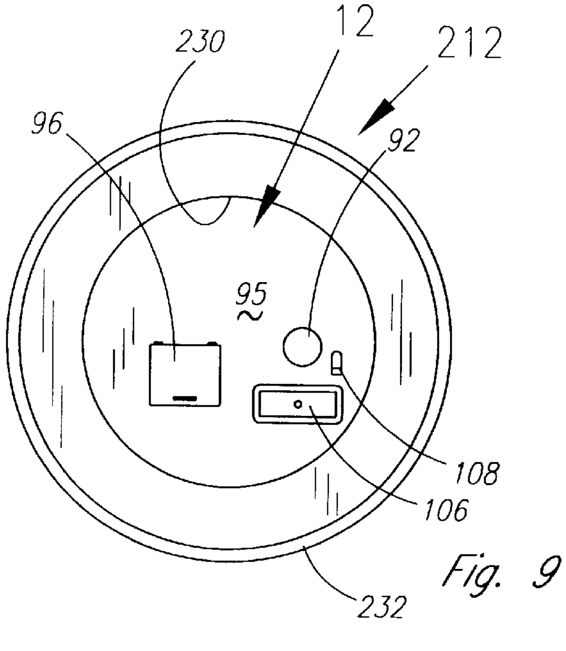
FIG. 9 is a top plan view of a third alternate embodiment customer counter shown attached to the base cabinet.

The third alternate customer counter 212, which is illustrated in FIG. 9, also secures to the base cabinet 12 in the same manner as previously described for the first alternate customer counter 208. The third alternate customer counter 212 is preferably circular in shape and has a large circular opening 230 provided centrally therein which allows access to the bartender counter 95, the ice bin access door 96, the tower 92, the water spray nozzle 108 and the sink 106 of the base cabinet 12.

Obviously, any number of combinations of shapes and openings can be incorporated into other alternate customer counters. The three alternate customer counters 208, 210 and 212 are presented herein only by way of example, and the invention is not to be considered limited to only these three examples. In addition, fluorescent lights, similar to the fluorescent light 154 described previously in association with the original customer counter 14, may also be optionally included in any of the alternate embodiments. Also, each alternate customer counter 208, 210 and 212 preferably includes an alternate rail 232 around its perimeter, as illustrated in FIGS. 7, 8 and 9.

While the invention has been described with a certain degree of particularity, it is manifest that many changes may be made in the details of construction and the arrangement of components without departing from the spirit and scope of this disclosure. It is understood that the invention is not limited to the embodiments set forth herein for the purposes of exemplification, but is to be limited only by the scope of the attached claim or claims, including the full range of equivalency to which each element thereof is entitled.

What is claimed is:

1. A mobile bar comprising a base cabinet mounted on casters, and a customer counter removably secured to said base cabinet, said customer counter movably secured to said base cabinet by means of tracks, each said track further comprising an upper track part that secures to a bottom side of the customer counter and a mating lower track part that secures to the base cabinet.

2. A mobile bar according to claim 1 further comprising means for releasably locking said customer counter to said base cabinet.

3. A mobile bar according to claim 1 further comprising rear portions pivotally attached to said customer counter in order that the rear portions may pivot downward so that they are parallel with a rear side of the base cabinet when said counter is moved on the tracks toward the rear side of the base cabinet.

4. A mobile bar according to claim 3 further comprising corners provided pivotally secured to said customer counter so that said corners can be pivoted upward 90°.

5. A mobile bar according to claim 1 further comprising a beverage dispensing tower extending upward from a bartender counter provided on said base cabinet, said tower in liquid communication with a beverage keg located in a refrigerated keg compartment provided in said base cabinet.

6. A mobile bar according to claim 5 wherein said beverage dispensing tower is slanted to allow said customer counter to slide on said tracks toward a rear side of said base cabinet.

7. mobile bar according to claim 5 further comprising a weight measuring device provided associated with each keg in said keg compartment for each keg to sit upon, each said weight measuring device being connected to an indicator device for signalling when the keg is approaching empty.

8. A mobile bar according to claim 5 further comprising a non-refrigerated gas compartment being provided in said base cabinet for removably receiving a gas bottle, a gas bottle removably secured in said gas compartment, and a gas line extending from said gas bottle to each keg.

9. A mobile bar according to claim 8 further comprising a refrigeration compressor and condenser coil being provided within a non-refrigerated refrigeration unit compartment provided in said base cabinet, said compressor connected to and supplying compressed coolant to said condenser coil, and at least one cooling coil provided in said keg compartment, each cooling coil connected to and receiving coolant from said condenser coil, and each cooling coil connected to and supplying coolant to said compressor.

10. A mobile bar according to claim 9 further comprising a sink provided in said bartender counter below said beverage dispensing tower, a drain leading from said sink to a drain bucket located within the base cabinet, and a water spray nozzle provided in said bartender counter adjacent said sink, means to connect said base cabinet to a fresh water supply in order to provide water to said water spray nozzle.

11. A mobile bar according to claim 9 further comprising an ice storage bin provided extending into the refrigerated keg compartment, and an ice bin access door provided on the bartender counter for accessing ice contained in said ice storage bin.

12. A mobile bar according to claim 11 further comprising an ice water storage line extending from an opening in a bottom of the ice storage bin to an ice water valve provided at a rear side of the base cabinet.

13. A mobile bar according to claim 1 further comprising a fluorescent light removably attached to a bottom side of said customer counter.

14. A mobile bar according to claim 13 further comprising glass blocks incorporated in support walls provided on the base cabinet, and said customer cabinet removably securing to said support walls.

15. A mobile bar according to claim 1 further comprising means to connect said base cabinet to a remote power source in order to provide electricity to said base cabinet.

16. A mobile bar according the claim 1 further comprising a battery provided in said base cabinet to serve as a source of electricity for said base cabinet.

17. A mobile bar comprising a base cabinet mounted on casters, and a customer counter pivotally secured to said base cabinet so that said customer counter pivots approximately 90 degrees from horizontal to place the customer counter in its transport position.

* * * * *